W. J. WHITAKER.
SAW TABLE AND TRACK.
APPLICATION FILED APR. 13, 1915. RENEWED OCT. 21, 1916.
1,225,545.
Patented May 8, 1917.
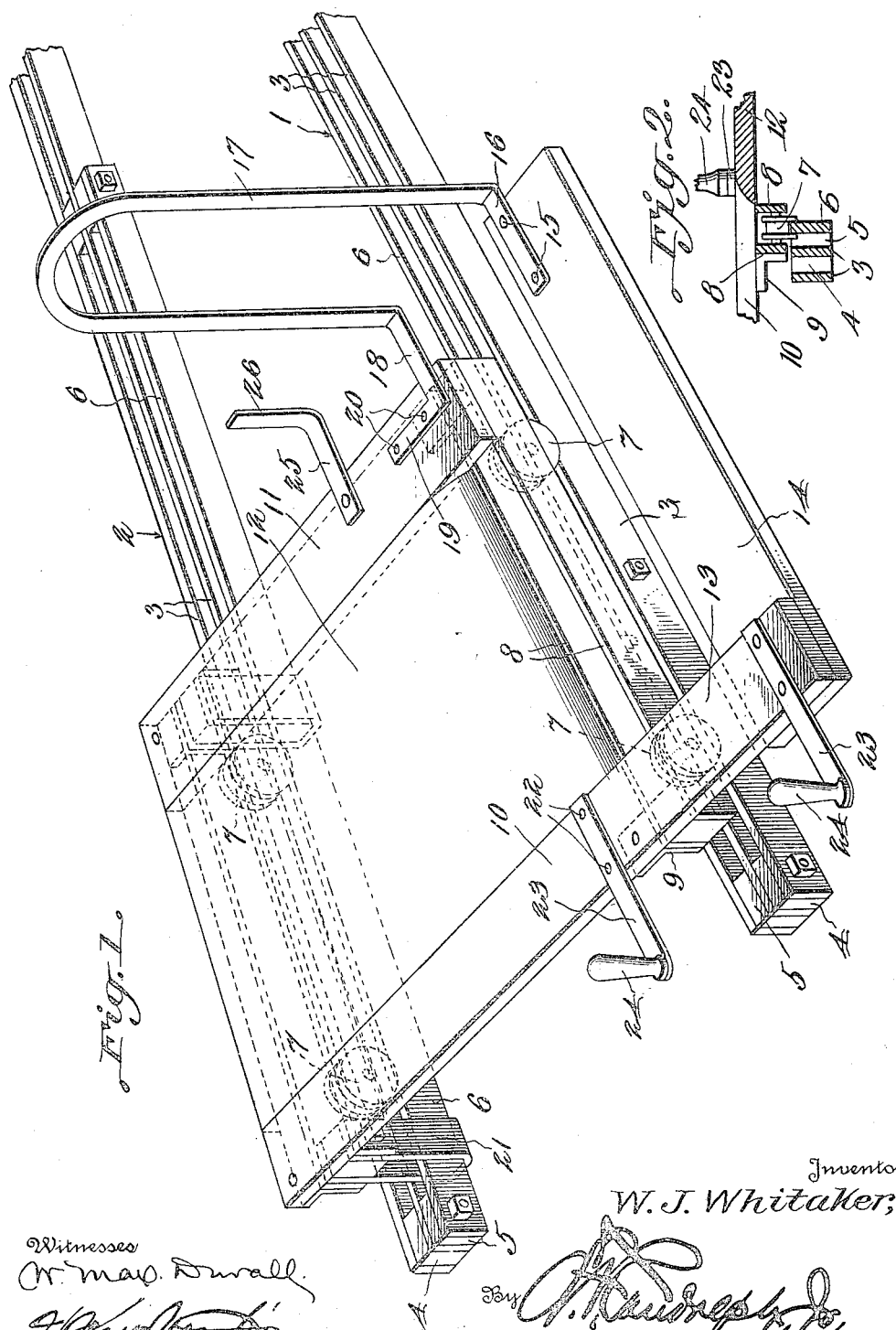
Inventor
W. J. Whitaker;
Witnesses

UNITED STATES PATENT OFFICE.

WILLIAM J. WHITAKER, OF REEDS, MISSOURI.

SAW-TABLE AND TRACK.

1,225,545. Specification of Letters Patent. Patented May 8, 1917.

Application filed April 13, 1915, Serial No. 21,092. Renewed October 21, 1916. Serial No. 127,034.

*To all whom it may concern:*

Be it known that I, WILLIAM J. WHITAKER, a citizen of the United States, residing at Reeds, in the county of Jasper and State of Missouri, have invented certain new and useful Improvements in Saw-Tables and Tracks; and I do hereby declare the following to be a full, clear, and exact description of the invention, such as will enable others skilled in the art to which it appertains to make and use the same.

This invention relates to new and useful improvements in saw tables and tracks therefor and has for its principal object to provide an improved saw table which will effectively support articles to be sawed in proper position.

Another object of the invention is to provide a saw table having guide rollers so that the same may be easily moved into sawing position.

A further object of the invention is to provide a novel means for supporting the table on the frame.

A further object of the invention is to provide a suitable guide for the table which will prevent the same from tipping when the article to be sawed is being placed thereon.

Still another object of the invention is to provide a novel form of support to keep the pole from touching the saw until it is ready to be sawed off.

With these and other objects in view the invention consists in the novel combination and arrangement of parts which will be fully set forth in the following specification and accompanying drawing.

Figure 1 illustrates a saw table and support therefor constructed in accordance with this invention, and Fig. 2 is a transverse sectional view through a portion of the device, illustrating the detailed construction of the table.

Referring in detail to the drawing by characters of reference the numeral 1 designates as an entirety one of the supporting arms of the saw and table while the numeral 2 designates the coöperating supporting arm. Each of these supporting arms comprises the strips 3 which are preferably of metal or any other suitable material which strips are held in spaced relation by means of the blocks 4.

Spaced inwardly from the strips by means of the blocks 5 are the table guides 6 on which the rollers 7 which are journaled on the table run.

The saw table above referred to comprises the parallel supporting bars 8 between which the rollers 7 are journaled and these bars are held in spaced relation by means of the angle plates 9 which are connected to the transversely extending bars 10 and 11 of the table. These transversely extending bars 10 and 11 connect the two sets of bars 8 and form a rectangular frame which is provided with a suitable platform 12. The bar 10 is extended as at 13 and has secured near it outer end a forwardly extending bar 14, the free end of which is connected by means of screws or bolts 15 to the angular extension 16 formed on the U-shaped arch member 17, the opposite terminal of which is bent angularly as at 18 and provided with the lateral extension 19 which is screwed or bolted as at 20 to the bar 11. It will thus be seen that the bar 14 is firmly supported at each end and that danger of the same coming out of alinement is prohibited.

In order to prevent the table from tipping when the article to be sawed is placed thereon, the U-shaped clips 21 are secured to the set of bars 8 opposite the extension 13 and these clips extend below and surround the guide 6 on that side. Bolted or otherwise secured as at 22 to the bar 10 and extension 13 are the arms 23 which carry at their outer ends the gripping portions 24 which form handles by which the device is manipulated. Coöperating with the U-shaped member 17 is the forward extension 25 which is provided at its outer end with the upturned member 26.

It will be apparent from the foregoing that in use when the article to be sawed is being placed on the table, it is slid over the end portion and due to the fact that the U-shaped members 21 embrace the rail on the left side it will be evident that the table will be prevented from tipping. Upon grasping the handles 24 and pushing the table forwardly so that the member 17 bridges the saw it will be evident that the article to be sawed will be brought into contact with the saw blade and the same cut into. It will also be evident that due to the fact that the device is mounted on rollers it will be particularly easily operated requiring but little energy on the part of the user.

While in the foregoing there has been shown and described the preferred embodiment of this invention, it is to be understood that such changes may be made in the combination and arrangement of parts as will fall within the spirit and scope of the appended claim.

What is claimed is:

A saw table comprising a pair of end bars, one of said end bars extending beyond the other, side bars connecting the end bars, said side bars comprising a pair of spaced strips held in spaced parallel relation by blocks, guide rollers journaled between the strips and near the end bars, U-shaped brackets secured to one of the side bars to prevent the table from tipping, the longer end bar extending beyond the plane of the opposite side bar, a platform supported on the side bars and extending between the end bars, a forwardly-extending bar secured to the extension of the longer end bar and projecting in a plane parallel with the side bars, the ends of said forwardly-extending bars being in the same plane with the ends of the side bars, the said bar being positioned in a plane beneath the upper face of the platform, and an inverted U-shaped bracket connecting the forward end of the forwardly-extending bar with the foremost end bar, said bracket being adapted to accommodate a saw when the carriage is moved forwardly.

In testimony whereof I affix my signature in presence of two witnesses.

WILLIAM J. WHITAKER.

Witnesses:
 JOHN W. CAMPBELL,
 ELZIE HOLLINGSWORTH.

Copies of this patent may be obtained for five cents each, by addressing the "Commissioner of Patents, Washington, D. C."